March 24, 1959  H. A. STRICKLAND  2,879,368
ELECTRIC COOKING APPLIANCES
Filed Dec. 24, 1957  2 Sheets-Sheet 1

INVENTOR.
Harold A. Strickland Jr.
BY
Smith, Prangley, Baird &Clayton,
Attys.

March 24, 1959    H. A. STRICKLAND    2,879,368
ELECTRIC COOKING APPLIANCES
Filed Dec. 24, 1957    2 Sheets-Sheet 2

INVENTOR.
Harold A. Strickland Jr.
BY
Smith, Prangley, Baird & Clayton,
Attys.

United States Patent Office 2,879,368
Patented Mar. 24, 1959

2,879,368

ELECTRIC COOKING APPLIANCES

Harold A. Strickland, Mount Kisco, N.Y., assignor to General Electric Company, a corporation of New York Application December 24, 1957, Serial No. 705,026

12 Claims. (Cl. 219—20)

The present invention relates to cooking appliances, and more particularly to improved control circuits for such apliances.

It is a general object of the invention to provide a temperature control circuit for an electric heating unit, incorporated in a cooking appliance, or the like, that involves a temperature sensing resistor having a high temperature coefficient of resistance and arranged in heat exchange relation with a medium heated by the heating unit, so that the temperature sensing resistor has an effective resistance that is related to the temperature of the medium, and that comprises an improved circuit arrangement governed by the effective resistance of the temperature sensing resistor for selectively controlling the energization of the heating unit.

Another object of the invention is to provide a temperature control circuit of the character noted, that is especially suitable for use in a cooking appliance in which the heating unit is arranged to support a cooking vessel and in which the temperature sensing resistor is arranged to sense the temperature of the supported cooking vessel and its contents.

Another object of the invention is to provide a temperature control circuit of the character noted, incorporating an improved cycle timing arrangement so that in each cycle thereof the temperature sensing resistor is energized only momentarily, whereby there is no substantial heating of the temperature sensing resistor by $I^2R$ losses therein.

Another object of the invention is to provide a temperature control circuit of the character noted, incorporating a cyclic timer for completing only momentarily in each cycle thereof the circuit for energizing the temperature sensing resistor, thereby rendering it feasible for the temperature sensing resistor to conduct a very substantial current during the momentary energization thereof, without damage thereto, and without undue heating thereof, whereby an electromagnetic relay may be selectively directly controlled in the circuit, without a power amplifier, for the purpose of governing the energization of the heating unit.

A further object of the invention is to provide in a temperature control circuit of the character noted, an improved and simplified arrangement of the individual circuits incorporated therein.

Further features of the invention pertain to the particular arrangement of the elements of the temperature control circuit, whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
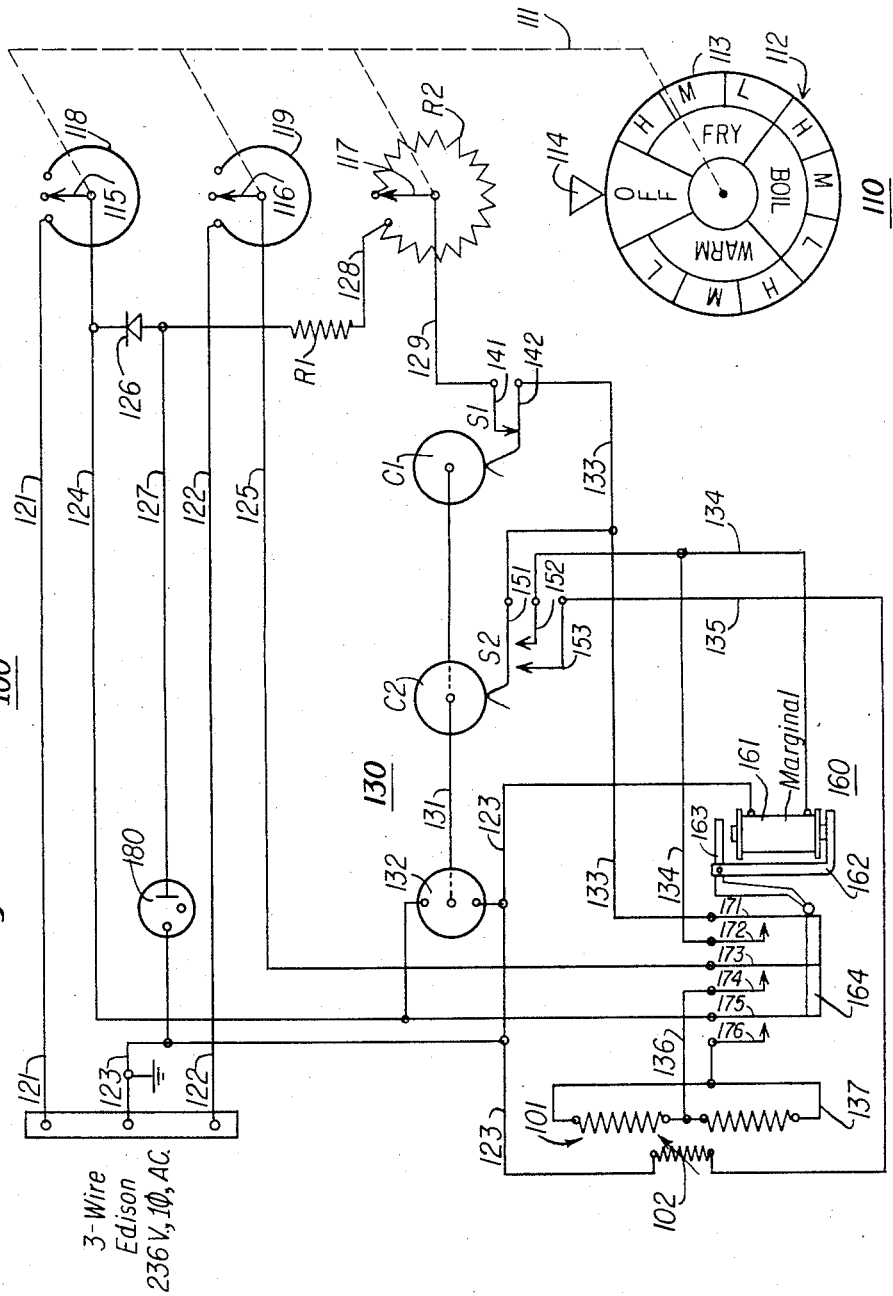
Figure 1 is a diagrammatic illustration of an electric heating system incorporating a temperature control circuit embodying the present invention.

Referring now to Fig. 1, the electric heating system 100 there illustrated, and embodying the features of the present invention, is incorporated in an electric range, or other cooking appliance, and comprises an electric heating unit 101 and a temperature sensing resistor 102, the temperature sensing resistor 102 being arranged in heat exchange relation with the medium that is heated by the heating unit 101. For example, the heating unit 101 and the temperature sensing resistor 102 may be related in the manner disclosed in U.S. Patent No. 2,727,975, granted on December 20, 1955 to Kenneth H. Walkoe and Robert J. Molyneaux, and whereby the heating unit 101 comprises a surface heating unit formed to provide a supporting platform for a cooking vessel, or the like, and having a center opening therein into which the temperature sensing resistor 102 is resiliently mounted, the temperature sensing resistor 102 being arranged to cooperate with the bottom wall of the cooking vessel supported by the heating unit 101. Accordingly, when a cooking vessel is supported by the heating unit 101 and the heating unit 101 is energized, the cooking vessel and its contents are heated; and the temperature sensing resistor 102 is arranged in engagement with the bottom of the cooking vessel in good heat exchange relation therewith, whereby the temperature of the temperature sensing resistor closely follows that of the supported cooking vessel and its contents.

The temperature sensing resistor 102 is formed of material having a high negative temperature coefficient of resistance such, for example, as the ceramic-like material consisting of sintered aluminum oxide, and an oxide of magnesium, manganese, titanium, iron, nickel, cobalt, zinc, etc., and known as "thermistor" material. For example, the thermistor 102 may have the exceedingly high temperature coefficient of resistance corresponding to a resistance rate change of −0.044 ohm/ohm°/C.; whereby the characteristic of the thermistor may be as follows:

| Thermistor (° C.) | Total Resistance (ohms) |
|---|---|
| 25 | 100,000 |
| 50 | 34,000 |
| 100 | 6,000 |
| 150 | 1,700 |
| 200 | 580 |

Further, the system 100 comprises a control switch 110 including a rotatably mounted operating shaft 111 carrying a manual dial or knob 112 on the outer end thereof and provided with indicia 113 cooperating with an index marker 114. More particularly, the control switch 110 comprises off, warm, boil and fry positions that correspond to respective portions of the indicia 113 carried by the manual dial 112 and cooperating with the index marker 114, each of the warm, boil and fry ranges including low, medium and high sections. In the arrangement, the indicia 113 carried by the manual dial 112 correspond to temperatures of a cooking vessel supported by the heating unit 101; whereby the warm range may correspond to the temperature range 120° F. to 220° F., the boil range may correspond to the temperature range 220° F. to 320° F., and the fry range may correspond to the temperature range 320° F. to 420° F. Accordingly, the warm, boil and fry ranges respectively correspond to meat cooking, candy making and deep fat frying cooking operations. Further, the rotatable shaft 111 carries three wipers 115, 116 and 117 that are simultaneously adjusted as the manual dial 112 is rotated. The wipers 115 and 116 respectively comprise portions of two switches respectively including cooperating contact segments 118 and 119; and the wiper 117 comprises a portion of a rheostat including a control resistor R2.

Also the system 100 comprises a 3-wire Edison source of power supply of 236 volts, single-phase, A.-C., including two outside ungrounded lines 121 and 122 and a grounded neutral line 123, the lines 121 and 122 being respectively connected to the contact segments 118 and 119 of the two switches previously mentioned, and the two wipers 115 and 116 thereof being respectively connected to two conductors 124 and 125. The conductor 124 is connected by a rectifier 126, that may comprise a selenium diode, to a supply conductor 127, that is connected to one terminal of a load resistor R1, the other terminal of the load resistor R1 being connected by a conductor 128 to one terminal of the control resistor R2; and the wiper 117 is connected to a feed conductor 129.

Further, the heating system 100 comprises a cyclic timer 130 that includes a rotatably mounted operating shaft 131 that carries two insulating cams C1 and C2 that respectively control two associated switches S1 and S2; and also the timer 130 comprises an electric drive motor 132 that is of the synchronous type and is preferably a "Telechron" timer motor arranged to rotate the shaft 131 precisely one revolution in a fixed time interval, such, for example, as ten seconds. The electric timer motor 132 is connected across the conductor 124 and the neutral line 123. The switch S1 includes two individual switch springs 141 and 142 that are normally closed; and the switch S2 includes three individual switch springs 151, 152 and 153 that are normally open. In the arrangement: the switch spring 141 is connected to the feed conductor 129; the switch springs 142 and 151 are commonly connected to a test conductor 133; the switch spring 152 is connected to a conductor 134; and the switch spring 153 is connected to a conductor 135. The conductor 135 is connected to one terminal of the thermistor 102 and the other terminal thereof is connected to the neutral line 123.

Also the system 100 comprises an electromechanical relay 160 of the marginal type and provided with a winding 161 connected between the conductor 134 and the neutral line 123, as well as a field piece 162 that carries a pivotally mounted armature 163; the armature 163 cooperates with an insulating actuating element 164 that is operatively connected to three movable switch springs 171, 173 and 175 that respectively cooperate with three stationary switch springs 172, 174 and 176. The switch spring 171 is connected to the test conductor 133; the switch springs 173 and 175 are respectively connected to the conductors 125 and 124; the switch spring 172 is connected to the conductor 134; and the switch springs 174 and 176 are respectively connected to two conductors 136 and 137. The heating unit 101 is arranged in two sections; whereby the two inside terminals of the two sections thereof are commonly connected to the conductor 136 and the two outside terminals of the two sections thereof are commonly connected to the conductor 137. Finally a voltage regulator 180 in the form of a gaseous discharge tube of the glow discharge type is connected between the supply conductor 127 and the grounded neutral line 123.

When the control switch 110 occupies its off position, the wipers 115 and 116 respectively disengage the contact segments 118 and 119, thereby interrupting the connections to the conductors 124 and 125, and the wiper 117 engages the extremity of the control resistor R2 so as to insure the insertion of the total value thereof between the conductor 128 and the feed conductor 129. When power is thus removed from the conductor 124, operation of the timer motor 132 is arrested so as to arrest operation of the cyclic timer 130. Also, when power is thus removed from the supply conductor 127, the relay 160 occupies its restored position so as to interrupt at the sets of switch springs 173–174 and 175–176 connections between the conductors 125 and 124 and the heating unit 101 so that the heating unit 101 is deenergized at this time. Also, at this time, it may be assumed that the heating unit 101 is cold and that likewise the temperature sensing resistor 102 is cold so that it has a maximum resistance, as previously explained.

Now assuming that a cooking operation is to be carried out, the cook places the cooking vessel and its contents in its supported position upon the heating unit 101; whereby the bottom wall of the cooking vessel is arranged in good heat-exchange relationship, with both the heating unit 101 and the thermistor 102. Then the cook operates the manual dial 112 from its off position into one of the cooking ranges thereof such, for example, as the warm temperature range thereof; whereby the wipers 115 and 116 respectively engage the associated contact segments 118 and 119, thereby connecting the outside lines 121 and 122 of the power source to the respective conductors 124 and 125. Also rotation of the manual dial 112 out of its off position into its warm position effects a corresponding adjustment of the wiper 117 with respect to the control resistor R2 so as to exclude a small portion of the control resistor R2 from the connection between the conductor 128 and the feed conductor 129. The connection of power to the conductor 124 completes a circuit for operating the timer motor 132 so that cyclic operation of the timer 130 is initiated. Also at this time, a series connection is completed from the conductor 124 via the diode or rectifier 126 to the supply conductor 127 and therefrom via the load resistor R1, the conductor 128, the resistor R2, the wiper 117, the feed conductor 129, the switch S1 to the test conductor 133. Subsequently in the operation of the timer 130, the switch spring S1 is momentarily opened and then reclosed to disconnect the feed conductor 129 from the test conductor 133 and then to reconnect the conductors 129 and 133; and immediately thereafter the switch S2 is momentarily closed and then reopened to connect the test conductor 133 in parallel relation to the conductors 134 and 135 and then to disconnect the test conductor 133 from the conductors 134 and 135.

Figure 2:
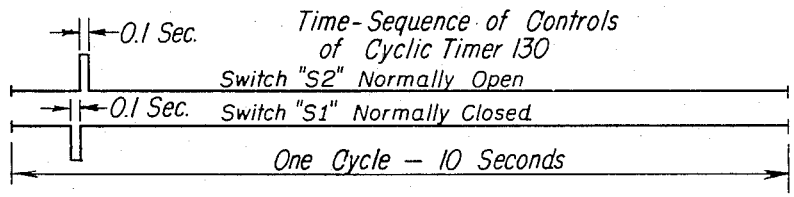
Fig. 2 is a graphic illustration of the time-sequence controls of a cyclic timer incorporated in the temperature control circuit of Fig. 1.

Before proceeding with the description of the operation of the heating system 100 in response to the above-described operations of the switches S1 and S2 by the timer 130, reference is made to Fig. 2, wherein the time-sequence of the controls exercised by the timer 130 are illustrated. In this example, the cyclic timer 130 is operative through a cycle of a time duration of ten seconds; and in the cycle, the cam C1 momentarily opens and then recloses the normally closed switch S1 and immediately thereafter the cam C2 closes and then reopens the normally open switch S2; the momentary open time interval of the normally closed switch S1 being about 0.1 second, and the momentary closed time interval of the normally open switch S2 being about 0.1 second. Of course it will be understood that the cyclic timer 130 is operative cyclically so long as the timer motor 132 is energized.

Returning now to the description of the operation of the heating system 100: the closure of the switch S2 completes the previously mentioned connection between the test conductor 133 and the conductor 135, thereby to complete a circuit to the grounded neutral line 123 for energizing the thermistor 102; and the closure of the switch S2 completes the previously mentioned connection between the test conductor 133 and the conductor 134, thereby to complete a circuit to the grounded neutral line 123 for energizing the winding 161 of the relay 160; whereby there is momentarily completed the parallel circuits for energizing the thermistor 102 and the winding 161. At this time, the resistance of the thermistor 102 is exceedingly high as it has been assumed that the heating unit 101 and the thermistor 102 are cold; accordingly, an exceedingly small current traverses the above-traced series circuit including the thermistor 102, whereby there is exceedingly small loading of the control resistor R2 and the load resistor R1 so that substantially the rectified voltage appearing upon the supply conductor 127 is impressed upon the feed conductor 129 and thus upon the test conductor 133. Hence, substantially the full voltage of the supply conductor 127 appearing upon the feed conductor 133 is impressed across the winding 161 of the relay 160, whereby the latter relay operates, it being of the marginal type, as explained more fully hereinafter. Upon operating the relay 160 actuates its armature 163, whereby the switch springs 171, 173 and 175 are operated to engage the associated switch springs 172, 174 and 176. Closure of the set of switch springs 171—172 completes a direct connection between the test conductor 133 and the conductor 134 so as to complete a holding circuit for energizing the winding 161 of the relay 160 that is independent of the position of the switch S2. Closure of the sets of switch springs 173—174 and 175—176 connects the two sections of the heating unit 101 in parallel relation across the conductors 125 and 124 and consequently across the lines 122 and 121 of the supply source, with the result that the two sections of the heating unit 101 are energized in parallel relation across the 236 volts of the power supply source.

As previously explained, the switch S2 is only momentarily closed and upon reopening thereof, the above-traced circuit for energizing the thermistor 102 and the above-traced pickup circuit for energizing the winding 161 of the relay 160 are interrupted. The interruption of the circuit for energizing the thermistor 102 insures that the thermistor 102 is not heated substantially by I²R losses therein; and the interruption of the pickup circuit for energizing the winding 161 of the relay 160 is without effect by virtue of the previously completed holding circuit for energizing the winding 161, as explained above. Accordingly, the relay 160 is retained in its operated position so as to retain the heating connection between the heating unit 101 and the conductors 124 and 125.

In the next cycle of operation of the timer 130, the switch S1 is momentarily opened and then reclosed, as previously noted; whereby opening of the switch S1 interrupts the previously traced holding circuit, including the test conductor 133, for energizing the winding 161 of the relay 160; whereby the latter relay restores to interrupt at the set of switch springs 171—172 a further point in the holding circuit for energizing the winding 161 thereof, and to interrupt at the sets of switch springs 173—174 and 175—176 the heating connection between the heating unit 101 and the conductors 124 and 125. However, immediately after reclosure of the switch S1, the switch S2 is momentarily closed and then reopened, whereby the relay 160 is reoperated, in the manner previously explained.

As time proceeds, the heating unit 101 heats the supported cooking vessel and its contents, thereby effecting heating of the thermistor 102, with the result that the resistance thereof decreases as the temperature thereof increases. As the resistance of the thermistor 102 decreases, the load imposed thereby upon the resistors R1 and R2, incident to closure of the switch S2 is increased, with the result that the RI voltage drop thereacross is correspondingly increased effecting a corresponding reduction in the voltage applied to the test conductor 133. Ultimately, when the temperature of the cooking vessel and its contents reaches the temperature preset by the adjustment of the manual dial 112 of the control switch 110, the temperature of the thermistor 102 effects a reduction in the resistance such that the load imposed upon the resistors R1 and R2 incident to the closure of the switch S2 is such that the RI drop across the resistors R1 and R2 causes the residual voltage upon the test conductor 133 to be less than the pickup voltage of the winding 161 of the relay 160; whereby at this time further operation of the relay 160 is temporarily arrested.

As time passes, the cooking vessel and its contents, as well as the heating unit 101 and the thermistor 102, cool so that the resistance of the thermistor 102 is increased, with the result that subsequently when the series circuit is completed including the thermistor 102 and the resistors R1 and R2, there will be sufficient residual voltage upon the test conductor 133 again to effect operation of the relay 160; whereby the relay 160 upon reoperating initiates further heating of the heating unit 101.

The operations described above are effected repeatedly; whereby the heating unit 101 is repeatedly energized and deenergized so as to maintain the cooking vessel and its contents substantially at the temperature preset by the adjustment of the control switch 110 as sensed by the thermistor 102.

In order to terminate the cooking operation, the control switch 110 is returned back into its off position so that the wipers 115 and 116 respectively disengage the contact segments 118 and 119 in order to disconnect the conductors 124 and 125 from the line conductors 121 and 122, thereby to arrest the operation of the timer motor 132 and to effect the restoration of the relay 160 and the resulting further deenergization of the heating unit 101.

Reconsidering the operation of the heating system 100, it is pointed out that when the control switch 110 occupies other than its off position, the timer motor 132 is operated so that the switches S1 and S2 are cyclically operated in the manner previously explained, with the result that the thermistor 102 cyclically tests or senses the temperature of the supported cooking vessel and thereby controls, in conjunction with the fixed load resistor R1 and the adjusted control resistor R2, the residual voltage that appears upon the test conductor 133, so as to control the relay 160 to bring about the control of the supply of power to the heating unit 101. In the operation of the heating system 100, the connection of the glow discharge tube 180 between the supply conductor 127 and the grounded neutral line 123 is effective to regulate the one-half wave rectified voltage appearing upon the supply conductor 127 so as to maintain the same substantially constant; whereby the residual voltage that is present upon the test conductor 133, when the relay 160 occupies its restored position and when the switch S2 is closed, depends jointly upon the resistance of the thermistor 102, as determined by the temperature of the associated cooking vessel and its contents, and upon the fixed resistance of the resistor R1 and the adjusted resistance of the resistor R2. Accordingly, it will be understood that as the resistance of the control resistor R2 is reduced, by adjustment of the manual dial 112 of the control switch 110 in the clockwise direction, the resistance of the above-traced series circuit, including the resistors R1 and R2 and the thermistor 102, is reduced so that a larger current must traverse the resistors R1 and R2 to effect the required RI voltage drops therein to bring about the production of a residual voltage upon the test conductor 133 below the pickup voltage of the winding 161 of the relay 160; whereby the increased current can be obtained only by a corresponding reduction in the resistance of the thermistor 102 that is brought about by a high temperature thereof. Hence, it will be understood that the clockwise adjustment of the manual dial 112 of the control switch 110 in the on position thereof is effective to set higher temperatures to be maintained by the thermistor 102.

In view of the foregoing description of the mode of operation of the heating system 100, it will be appreciated that the thermistor 102 is energized only during the exceedingly short time interval of 0.1 second in each ten-second cycle of the timer 130; whereby the energization of the thermistor 102 is during only 1% of the total cycle time interval, so that the current conducted by the thermistor 102 during this exceedingly short time interval may be manifold the continuous current rating thereof, without damage thereto. Moreover, since the switch S1 is opened and then reclosed immediately preceding the closing and reopening of the switch S2, the relay 160 restores in each cycle of the timer 130 and is then reoperated only in the event that further heating of the heating unit 101 is required as sensed by the thermistor 102; which sensing by the thermistor 102 effects the pickup of the relay 160 only in the event that further heating of the heating unit 101 is required. Accordingly, it is only the pickup characteristic of the relay 160 that is tested incident to closure of the switch S2, as the relay 160 is always dropped out or restored incident to opening of the switch S1 in each cycle of the timer 130. This arrangement is very advantageous as it permits very accurate control of the testing by the relay 160 since the pickup characteristic thereof is substantially constant over a wide range of operating conditions thereof. Moreover, when the thermistor 102 is cold, the relay 160 occupies its operated position about 99% of the total cycle time interval, thereby to insure fast heating of the heating unit 101 from a cold condition to a control condition, as previously explained.

Figure 3:
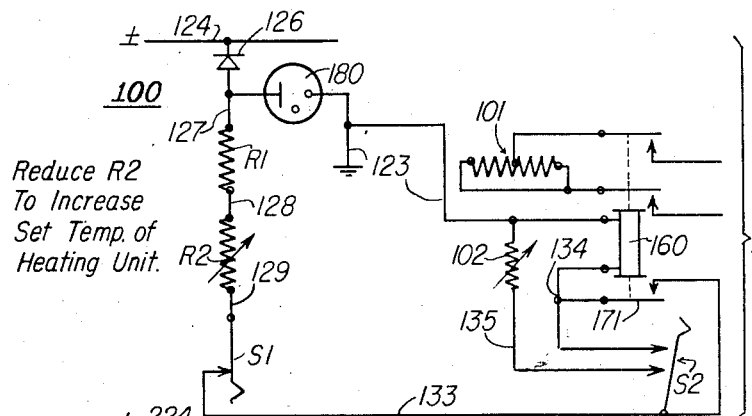
Fig. 3 is an elementary diagram of the temperature control circuit of Fig. 1.

In Fig. 3, there is shown an elementary diagram of the heating system 100; whereby it will be observed that the resistors R1 and R2 are connected in series circuit relation between the supply conductor 127 and the feed conductor 129, as previously described; whereby it is necessary to reduce the resistance of the resistor R2 in order to increase the temperature setting of the heating unit 101, for the reasons previously explained.

Figure 4:
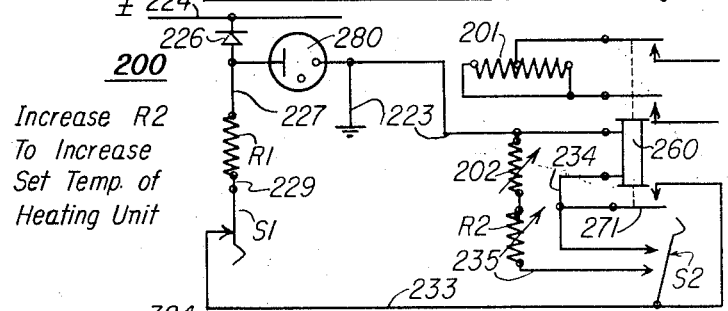
Fig. 4 is an elementary diagram of a modified form of the temperature control circuit.

In Fig. 4, there is shown an elementary diagram of a modified form of the heating system 200, wherein it will be observed that only the load resistor R1 is connected between the supply conductor 227 and the feed conductor 229, the control resistor R2 being connected in series relation with the thermistor 202 between the conductor 235 and the grounded neutral line 223, so that it is necessary to increase the resistance of the resistor R2 in order to increase the temperature setting of the heating unit 201. This flows from the circumstance that the control resistor R2 and the thermistor 202 are on the same side of the test conductor 233, which is the opposite side with respect to the load resistor R1. The mode of operation of the heating system 200 is otherwise the same as that of the system 100, except that the adjustment of the control resistor R2 is reversed, as explained above.

Figure 5:
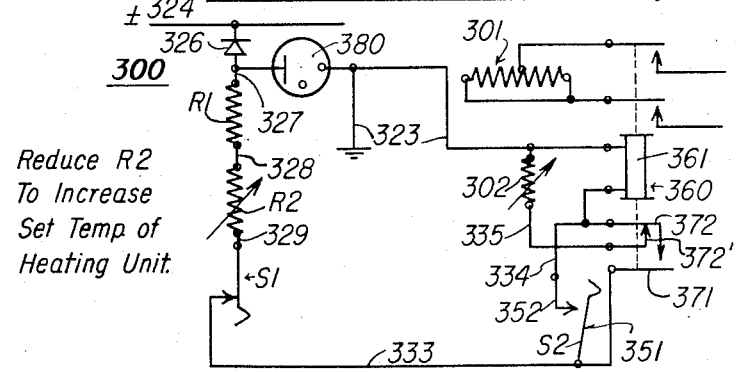
Fig. 5 is an elementary diagram of another modified form of the temperature control circuit.

In Fig. 5, there is shown an elementary diagram of a modified form of the heating system 300, which is fundamentally the same as that of the system 100 of Fig. 1, except that in this arrangement, the switch springs controlled by the relay 360 govern the interruption of the circuit through the thermistor 302. More particularly, the relay 360 comprises a set of make-before-break switch springs, including three individual switch springs 371, 372 and 372'. In the arrangement, when the relay 360 is restored, the switch spring 372 first engages the switch spring 372', and then the switch spring 371 disengages the switch spring 372; and when the relay 360 is operated, the switch spring 371 first engages the switch spring 372 causing the switch spring 372 then to disengage the switch spring 372'. Also in this arrangement, the winding 361 of the relay 360 is connected directly across the conductor 334 and the grounded neutral line 323; while the thermistor 302 is connected directly across the conductor 335 and the grounded neutral line 323. The switch spring 371 terminates the test conductor 333; the switch spring 372 terminates the conductor 334; and the switch spring 372' terminates the conductor 335. In this arrangement, the switch S2 comprises only two switch springs 351 and 352 that are respectively connected to the test conductor 333 and to the conductor 334.

Considering now the mode of operation of the system 300, when the cyclic timer, not shown, closes the set of switch springs S2, the conductor 334 is connected to the test conductor 333, whereby the series circuit including the load resistor R1, the control resistor R2, the closed switch S1 and the thermistor 302 is completed, which circuit also includes the closed switch springs 372 and 372'. At this time, the current that traverses this series circuit is dependent upon the temperature of the thermistor 302 and the adjusted position of the control resistor R2, in the manner previously explained; whereby the load imposed upon the resistors R1 and R2 brings about the presence of a corresponding residual voltage upon the test conductor 333 so that the relay 360 is operated only in the event the residual voltage mentioned exceeds the pickup voltage of the winding 361, in the manner previously explained. In the last-mentioned event, upon operating the relay 360 completes at the switch springs 371-372 a direct holding circuit for energizing the winding 361 between the grounded neutral line 323 and the test conductor 333 and independent of the position of the switch S2. Also upon operating the relay 360 disengages the switch spring 372 from the switch spring 372' so as to disconnect the conductor 335 from the conductor 334; whereby the thermistor 302 is isolated and thus deenergized in order to prevent heating thereof during the remainder of the cycle of the associated cyclic timer, not shown.

The system 300 possesses certain advantages over the system 100 of Fig. 1, in that the operating time of the relay 360 is substantially less than 0.1 second so that the thermistor 302 is energized only during a small fraction of the time interval of 0.1 second during which the switch S2 is closed by the associated cyclic timer. Accordingly, in the system 300 of Fig. 5, when the heating unit 301 is demanding heat, as sensed by the thermistor 302, the heating time interval of the thermistor 302 by $I^2R$ losses therein, during completion of the above traced series circuit, is reduced substantially below 1% of the total cyclic time interval of ten seconds; whereby it is feasible to permit very substantial currents to traverse the thermistor 302 throughout the exceedingly short time interval corresponding to the pickup time interval of the relay 360, so as further to increase the sensitivity of the temperature control arrangement. The operation of the system 300 is otherwise the same as that of the system 100 and is not described in further detail in the interest of brevity.

Recapitulating, in each of the three systems 100, 200 and 300, it is feasible to conduct very substantial currents greatly in excess of the continuous current rating of the thermistor during the exceedingly short test time intervals, since the total energy dissipated in the thermistor is exceedingly low; whereby it is feasible to effect the control of the heating unit circuit directly by the electromechanical relay, without the provision of the usual amplifier, thereby contributing to great economy in the arrangement. Moreover, in the temperature control circuit, it is only the pickup voltage of the electro-mechanical relay that is tested; which arrangement is very advantageous, since the pickup voltage of such a relay is substantially constant, as distinguished from the variable drop-out voltage thereof.

Accordingly, it is apparent that there has been provided an improved heating system and temperature control circuit therefor that effects a substantial economy in manufacture, while preserving accurate and sensitive controls of the heating facility.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a cooking appliance, an electric heating unit, a temperature sensing resistor having a high temperature coefficient of resistance and arranged in heat-exchange relation with a medium heated by said heating unit so that said temperature sensing resistor has an effective resistance that is related to the temperature of the medium, a power supply conductor, a feed conductor connected via a load resistor to said power supply conductor, a test conductor, a normally closed first switch for connecting said test conductor to said feed conductor, a relay provided with a winding, a normally open second switch for connecting said temperature sensing resistor and said winding in parallel relation to said test conductor, cyclic timing means for selectively operating said first and second switches in each cycle thereof so that said first switch is momentarily opened and then reclosed and so that said second switch is subsequently momentarily closed and then reopened, connection of said temperature sensing resistor to said test conductor effecting loading of said load resistor so as to establish a test voltage upon said test conductor that is dependent upon the effective resistance of said temperature sensing resistor, connection of said winding to said test conductor effecting energization of said winding in accordance with the test voltage upon said test conductor, said relay being of the marginal type so that it is operated upon energization of said winding only in the event at least a predetermined test voltage is present upon said test conductor, means responsive to operation of said relay for completing a holding circuit for energizing said winding from said test conducted that is independent of said second switch, opening of said first switch interrupting said holding circuit in the event said relay is operated so as to effect restoration of said relay, and means governed by said relay for controlling the energization of said heating unit.

2. The cooking appliance combination set forth in claim 1, wherein at least a predetermined current must traverse momentarily said temperature sensing resistor in order to effect loading of said load resistor so as to establish a test voltage upon said test conductor that is as low as said predetermined test voltage, and wherein said momentary predetermined current is many times the continuous rated current of said temperature sensing resistor.

3. The cooking appliance combination set forth in claim 1, wherein said temperature sensing resistor consists essentially of a thermistor.

4. The cooking appliance combination set forth in claim 1, wherein said cyclic timing means has a cycle time of at least several seconds and said second switch is momentarily closed and then reopened immediately following said momentary opening and then reclosing of said first switch, so that said relay, if operated, remains operated throughout substantially the entirety of said cycle time.

5. The cooking appliance combination set forth in claim 1, wherein said cyclic timing means has a cycle time of at least several seconds and said second switch is closed for a time interval of only a small fraction of a second during said cycle time, so that the ratio between said time interval and said cycle time is of the order of 1%, thereby to minimize heating of said temperature sensing resistor by RI² losses therein.

6. In a cooking appliance an electric heating unit, a temperature sensing resistor having a high temperature coefficient of resistance and arranged in heat-exchange relation with a medium heated by said heating unit so that said temperature sensing resistor has an effective resistance that is related to the temperature of the medium, a power supply conductor, a feed conductor connected via a load resistor to said power supply conductor, a test conductor, a normally closed first switch for connecting said test conductor to said feed conductor, a relay provided with a winding, a normally open second switch for connecting said temperature sensing resistor and said winding in parallel relation to said test conductor, cyclic timing means for selectively operating said first and second switches in each cycle thereof so that said first switch is momentarily opened and then reclosed and so that said second switch is subsequently momentarily closed and then reopened, connection of said temperature sensing resistor to said test conductor effecting loading of said load resistor so as to establish a test voltage upon said test conductor that is dependent upon the effective resistance of said temperature sensing resistor, connection of said winding to said test conductor effecting energization of said winding in accordance with the test voltage upon said test conductor, said relay being of the marginal type so that it is operated upon energization of said winding only in the event at least a predetermined test voltage is present upon said test conductor, means responsive to operation of said relay for completing a holding circuit for energizing said winding from said test conducted that is independent of said second switch, opening of said first switch interrupting said holding circuit in the event said relay is operated so as to effect restoration of said relay, and switching apparatus governed by said relay for controlling the energization of said heating unit, said switching apparatus being closed in response to operation of said relay and being opened in response to restoration of said relay.

7. In a cooking appliance, an electric heating unit, a temperature sensing resistor having a high temperature coefficient of resistance and arranged in heat-exchange relation with a medium heated by said heating unit so that said temperature sensing resistor has an effective resistance that is related to the temperature of the medium, a source of electric power, a power supply conductor, a cyclic timer, a manually operable control switch having an off position disconnecting said power supply conductor from said power source and arresting operation of said cycle timer and having an on position connecting said power supply conductor to said power source and initiating operation of said cycle timer, a feed conductor connected via a load resistor to said power supply conductor, a test conductor, a normally closed first switch for connecting said test conductor to said feed conductor, a relay provided with a winding, a normally open second switch for connecting said temperature sensing resistor and said winding in parallel relation to said test conductor, means controlled by operation of said cyclic timer for selectively operating said first and second switches so that in each cycle thereof said first switch is momentarily opened and then reclosed and so that said second switch is subsequently momentarily closed and then reopened, connection of said temperature sensing resistor to said test conductor effecting loading of said load resistor so as to establish a test voltage upon said test conductor that is dependent upon the effective resistance of said temperature sensing resistor, connection of said winding to said test conductor effecting energization of said winding in accordance with the test voltage upon said test conductor, said relay being of the marginal type so that it is operated upon energization of said winding only in the event at least a predetermined test voltage is present upon said test conductor, means responsive to operation of said relay for completing a holding circuit for energizing said winding from said test conductor that is independent of said second switch, opening of said first switch interrupting said holding circuit in the event said relay is operated so as to effect restoration of said relay, and means governed jointly by said control switch in its on position and by operation of said relay for energizing said heating unit from said power source.

8. In a cooking appliance, an electric heating unit, a temperature sensing resistor having a high temperature coefficient of resistance and arranged in heat-exchange relation with a medium heated by said heating unit so that said temperature sensing resistor has an effective resistance that is related to the temperature of the medium, a power supply conductor, a feed conductor connected via a load resistor to said power supply conductor, a test conductor, a normally closed first switch for connecting said test conductor to said feed conductor, a control resistor, manually operable means for selectively adjusting the effective resistance of said control resistor, a relay provided with a winding, a normally open second switch having a closed position completing a first circuit for loading said load resistor and completing a second circuit for energizing said winding, said first circuit including said test conductor and said temperature sensing resistor and said control resistor, said second circuit including said test conductor, cyclic timing means for selectively operating said first and second switches in each cycle thereof so that said first switch is momentarily opened and then reclosed and so that said second switch is subsequently momentarily closed and then reopened, completion of said first circuit in response to closing of said second switch establishing a test voltage upon said test conductor that is dependent jointly upon the adjusted effective resistance of said control resistor and upon the effective resistance of said temperature sensing resistor, said relay being of the marginal type so that it is operated upon energization of said winding in said second circuit only in the event at least a predetermined test voltage is present upon said test conductor, means responsive to operation of said relay for completing a holding circuit for energizing said winding from said test conductor that is independent of said second switch, opening of said first switch interrupting said holding circuit in the event said relay is operated so as to effect restoration of said relay, and means governed by said relay for controlling the energization of said heating unit.

9. In a cooking appliance, an electric heating unit, a temperature sensing resistor having a high temperature coefficient of resistance and arranged in heat-exchange relation with a medium heated by said heating unit so that said temperature sensing resistor has an effective resistance that is related to the temperature of the medium, a power supply conductor, a feed conductor connected via a control resistor to said power supply conductor, manually operable means for selectively adjusting the effective resistance of said control resistor, a test conductor, a normally closed first switch for connecting said test conductor to said feed conductor, a relay provided with a winding, a normally open second switch for connecting said temperature sensing resistor and said winding in parallel relation to said test conductor, cyclic timing means for selectively operating said first and second switches in each cycle thereof so that said first switch is momentarily opened and then reclosed and so that said second switch is subsequently momentarily closed and then reopened, connection of said temperature sensing resistor to said test conductor effecting loading of said control resistor so as to establish a test voltage upon said test conductor that is dependent jointly upon the adjusted effective resistance of said control resistor and upon the effective resistance of said temperature sensing resistor, connection of said winding to said test conductor effecting energization of said winding in accordance with the test voltage upon said test conductor, said relay being of the marginal type so that it is operated upon energization of said winding only in the event at least a predetermined test voltage is present upon said test conductor, means responsive to operation of said relay for completing a holding circuit for energizing said winding from said test conductor that is independent of said second switch, opening of said first switch interrupting said holding circuit in the event said relay is operated so as to effect restoration of said relay, and means governed by said relay for controlling the energization of said heating unit.

10. In a cooking appliance, an electric heating unit, a temperature sensing resistor having a high temperature coefficient of resistance and arranged in heat-exchange relation with a medium heated by said heating unit so that said temperature sensing resistor has an effective resistance that is related to the temperature of the medium, a power supply conductor, a feed conductor connected via a load resistor to said power supply conductor, a test conductor, a normally closed first switch for connecting said test conductor to said feed conductor, a control resistor, manually operable means for selectively adjusting the effective resistance of said control resistor, a relay provided with a winding, a normally open second switch for connecting said temperature sensing resistor and said control resistor in series relation to said test conductor and for connecting said winding in parallel relation to said temperature sensing resistor and said control resistor to said test conductor, cyclic timing means for selectively operating said first and second switches in each cycle thereof so that said first switch is momentarily opened and then reclosed and so that said second switch is subsequently momentarily closed and then reopened, connection of said temperature sensing resistor and said control resistor in series relation to said test conductor effecting loading of said load resistor so as to establish a test voltage upon said test conductor that is dependent jointly upon the adjusted effective resistance of said control resistor and upon the effective resistance of said temperature sensing resistor, connection of said winding to said test conductor effecting energization of said winding in accordance with the test voltage upon said test conductor, said relay being of the marginal type so that it is operated upon energization of said winding only in the event at least a predetermined test voltage is present upon said test conductor, means responsive to operation of said relay for completing a holding circuit for energizing said winding from said test conductor that is independent of said second switch, opening of said first switch interrupting said holding circuit in the event said relay is operated so as to effect restoration of said relay, and means governed by said relay for controlling the energization of said heating unit.

11. In a cooking appliance, an electric heating unit, a temperature sensing resistor having a high temperature coefficient of resistance and arranged in heat-exchange relation with a medium heated by said heating unit so that said temperature sensing resistor has an effective resistance that is related to the temperature of the medium, a power supply conductor, a feed conductor connected via a load resistor to said power supply conductor, a test conductor, a normally closed first switch for connecting said test conductor to said feed conductor, a relay provided with a winding connected to a switching conductor, said relay including contacts controlled in the restored position thereof for connecting said temperature sensing resistor to said switching conductor and for disconnecting said switching conductor from said test conductor and controlled in the operated positions thereof for disconnecting said temperature sensing resistor from said switching conductor and for connecting said switching conductor to said test conductor, a normally open second switch for connecting said switching conductor to said test conductor, cyclic timing means for selectively operating said first and second switches in each cycle thereof so that said first switch is momentarily opened and then reclosed and so that said second switch is subsequently momentarily closed and then reopened, closure of said second switch effecting energizing of said temperature sensing resistor and energizing of said winding in parallel relation, energization of said temperature sensing resistor effecting loading of said load resistor so as to establish a test voltage upon said test conductor that is dependent upon the effective resistance of said temperature sensing resistor, whereby the energization of said winding is in accordance with the test voltage upon said test conductor, said relay being of the marginal type so that it is operated upon energization of said winding only in the event at least a predetermined test voltage is present upon said test conductor, means responsive to operation of said relay for completing a holding circuit for energizing said winding from said test conductor that is independent of said second switch, opening of said first switch interrupting said holding circuit in the event said relay is operated so as to effect restoration of said relay, and means governed by said relay for controlling the energization of said heating unit.

12. The cooking appliance combination set forth in claim 11, wherein said contacts of said relay are of the make-before-break type so that upon operation of said relay said switching conductor is connected to said test conductor prior to the disconnection of said temperature sensing resistor from said switching conductor, so as to prevent hunting of said relay.

References Cited in the file of this patent

UNITED STATES PATENTS

| | | |
|---|---|---|
| 2,727,974 | Simmons | Dec. 20, 1955 |
| 2,727,975 | Molyneaux et al. | Dec. 20, 1955 |
| 2,764,662 | Conkling | Sept. 25, 1956 |
| 2,764,663 | Molyneaux | Sept. 25, 1956 |